| (12) | United States Patent<br>Liu | (10) Patent No.: US 7,813,035 B2<br>(45) Date of Patent: Oct. 12, 2010 |

(54) NONLINEARITY AND DISPERSION MANAGEMENT FOR PULSE RESHAPING IN HIGH ENERGY FIBER AMPLIFIER

(75) Inventor: Jian Liu, Sunnyvale, CA (US)

(73) Assignee: PolarOnyx, Inc., San Jose, CA (US)

( * ) Notice: Subject to any disclaimer, the term of this patent is extended or adjusted under 35 U.S.C. 154(b) by 262 days.

(21) Appl. No.: 11/804,487

(22) Filed: May 18, 2007

(65) Prior Publication Data

US 2008/0068702 A1    Mar. 20, 2008

Related U.S. Application Data

(60) Provisional application No. 60/801,267, filed on May 18, 2006.

(51) Int. Cl.
    *H04B 10/17* (2006.01)
(52) U.S. Cl. ........................ 359/337.5; 372/25; 359/348
(58) Field of Classification Search ............... 359/337.5, 359/348; 372/25
    See application file for complete search history.

(56) References Cited

U.S. PATENT DOCUMENTS 6,307,985 B1 * 10/2001 Murakami et al. ............ 385/24

2005/0105865 A1 * 5/2005 Fermann et al. ............ 385/122
2006/0120418 A1 * 6/2006 Harter et al. ................. 372/30
2006/0232847 A1 * 10/2006 Hirooka et al. ............ 359/237
2007/0098025 A1 * 5/2007 Hong et al. .................. 372/13

FOREIGN PATENT DOCUMENTS

EP           971495 A2 * 1/2000
WO    WO 2006113507 A2 * 10/2006

OTHER PUBLICATIONS

Bado, P. "Reliable, intense, ultrafast and compact guided-wave laser for cloud penetration, remote sensing, and active imaging" AFRL-DE-TR-2000-1079, Final Report, Sep. 2000.*

* cited by examiner

*Primary Examiner*—Eric Bolda
(74) *Attorney, Agent, or Firm*—John M. Taboada

(57) ABSTRACT

A short pulse fiber laser amplification system includes a special fiber stretcher, managed preamplifier, managed amplifier chain, and managed compressor to control an increase of a passive dispersion by managing a third order dispersion (TOD) to a group velocity dispersion (GVD) ratio for matching a nonlinearity chirp. In an exemplary embodiment, the TOD to GVD ratio is managed between approximately 1.5 to 15 fs to match a nonlinearity in range between $1\pi$ to $10\pi$. In another exemplary embodiment, the TOD to GVD ratio is managed between approximately 15 to 705 fs to match a nonlinearity in range between $1\pi$ to $50\pi$.

16 Claims, 2 Drawing Sheets

NONLINEARITY AND DISPERSION MANAGEMENT FOR PULSE RESHAPING IN HIGH ENERGY FIBER AMPLIFIER

This Formal Application claims a Priority Date of May 18, 2006 benefit from a Provisional Patent Applications 60/801,267 filed by the same Inventor of this Application. The disclosures made in 60/801,267 are hereby incorporated by reference in this Patent Application.

FIELD OF THE INVENTION

The present invention relates generally to apparatuses and methods for providing fiber laser system. More particularly, this invention relates a system configuration implemented with pulse shaping by managing non-linearity and dispersion that accumulate inside the fiber laser amplifier system to control the pulse reshaping dynamics and obtain the optimized pulse shape in the high energy short pulse fiber amplifier.

BACKGROUND OF THE INVENTION

Even though current technologies of fiber laser have made significant progress toward achieving a compact and reliable fiber laser system providing high quality output laser with ever increasing output energy, however those of ordinary skill in the art are still confronted with technical limitations and difficulties. Specifically, in a fiber laser system implemented with the Chirped Pulse Amplification (CPA) for short pulse high power laser amplifier, the non-linearity comes up naturally with the short pulse fiber laser. Due to the fact that the non-linearity effects are inherent with the short pulse laser fiber, and the removal of such non-linearity appears to be impossible, the bottom line problem is not to try to eliminate the non-linearity. Rather, the major thrust of research efforts now is directed toward a solution in finding a method to manage the non-linearity.

For a fiber laser system, the phenomenon of laser dispersion in a fiber laser system is confronted with the same difficulties with the same situation. The dispersion is inherently generated during the transmission and amplification of the laser in the fiber laser system. Furthermore, it is also practically impossible to remove the dispersion from a fiber laser system. Therefore, the key and the central idea is not to eliminate the nonlinearity and dispersions but to obtain the best pulse shape as that is necessary to control the nonlinearity and dispersion in the whole fiber amplifier system. However, the conventional technologies for configuring a high energy, short pulse fiber laser system have not yet provided a solution to effectively manage and resolve such difficulties.

FIG. 1 is a functional block diagram for illustrating a conventional short pulse fiber laser amplifier, namely, the fiber chirped pulse amplification (CPA) system. The fiber chirped pulse amplification laser system includes a mode-locking fiber laser 10, a fiber stretcher 15 to stretch the laser pulse to generate a long pulse, a preamplifier 20 to get high average power, pulse picker 25 to decrease the repetition rate so that real high energy is possible, an amplifier chain 30 to obtain high energy and a compressor 35 to generate pulses with short pulse duration.

In a high-energy short-pulse fiber laser system, the generation of dispersion is more than a passive effect. In the fiber laser system, besides the polarization mode dispersion (PMD), the material and waveguide dispersion are two main passive sources, which will affect the pulse shaping dynamics. The passive dispersion can be classified according to the mathematical expression and relevant importance for the pulse reshaping dynamics, as the group velocity dispersion (GVD) and the third order dispersion (TOD). The GVD and the TOD are introduced by the fiber components. A conventional single mode fiber stretcher may accumulate very high passive dispersion, including GVD and TOD and the pulse duration is then largely stretched accordingly. The stretched pulse is partly compressible without further amplification. FIGS. 2A and 2B illustrate the effect of passive dispersion on the pulse reshaping wherein FIG. 2A shows the pulse has a large pedestal due to the passive TOD dispersion effects. Although as shown in FIG. 2A, the center peak is still narrow, but the pedestal is getting quite high. In FIG. 2B, the corresponding spectrum as shown can actually support much shorter pulse with the time-bandwidth product as high as 3.7 and yet it is difficult to realize.

On the other hand, the nonlinearity not only generates more spectra via SPM and Stimulated Raman Scattering (SRS) thus inducing self-focusing under extreme peak power, the nonlinearity can also introduce drastically large chirp into the pulse. The large chirp might change the pulse shaping process permanently that is generally referred to as the nonlinearity chirp. Comparing with the passive dispersions, the nonlinearity chirp has different evolution dynamics and functionality for the pulse reshaping process. The pulse reshaping can be constructive or destructive and the pulse can be re-compressible, or it could be unable to get re-compressed. Conventional laser fiber systems still have limitations to assure that the laser transmitted in the system can be continuously maintained as a re-compressible pulse.

For a CPA fiber system shown in FIG. 1, two previously filed Patent Applications 60/062,905, and 60/082,705 filed by one the Applicants of this invention, a disclosure was made to use the nonlinear effect, i.e., the Self-Phase-Modulation (SPM), in the stretcher stage and after amplifier stage to improve the compressibility and to achieve shorter and shorter pulse, and apply these ideas in our laser system. However, there are still limitations in improvements that can be achieved through such fiber systems.

Therefore, a need still exists in the art of fiber laser design and manufacture to provide a new and improved configuration and method to provide fiber laser to manage the nonlinearity and the dispersion generated in the laser system such that the above-discussed difficulty may be resolved. Specifically, since the nonlinearity and the dispersion phenomena are encountered in the entire fiber system, it is further desirable to provide new and improved system configurations and method to manage the nonlinearity and the dispersion over the entire fiber system and over both high and low levels of laser energies to achieve even further improvements for even boarder scopes of applications.

SUMMARY OF THE PRESENT INVENTION

It is therefore an aspect of the present invention to provide a short pulse fiber laser amplification system by implementing a special fiber stretcher, managed preamplifier, managed amplifier chain, and managed compressor to control the increase of the passive dispersion. The control of the passive dispersion is achieved by managing the ratio of the higher order dispersion such as the TOD to the GVD to match the nonlinearity chirp such that the above-discussed difficulties as that encountered in the prior art may be resolved.

Specifically, it is an aspect of the present invention that a high-energy short pulse fiber laser system is implemented to achieve for the TOD/GVD between 1.5 fs to 15 fs, to match the nonlinearity in the range of $1\pi$ to $10\pi$. On the other hand, the nonlinearity of $10\pi$ to $50\pi$ is matched with a corresponding TOD/GVD of 15 fs to 75 fs.

Another aspect of this invention is to implement a high-energy short pulse fiber laser system to control the passive dispersion in the system by implementing special stretcher and special grating pair is designed to control the dispersion and to compensate the nonlinearity chirp.

Briefly, in a preferred embodiment, the present invention discloses short pulse fiber laser amplification system that includes a special fiber stretcher, managed preamplifier, managed amplifier chain, and managed compressor to control an increase of a passive dispersion by managing a third order dispersion (TOD) to a group velocity dispersion (GVD) ratio for matching a nonlinearity chirp. In an exemplary embodiment, the TOD to GVD ratio is managed between approximately 1.5 to 15 fs to match a nonlinearity in range between $1\pi$ to $10\pi$. In another exemplary embodiment, the TOD to GVD ratio is managed between approximately 15 to 75 fs to match a nonlinearity in range between $10\pi$ to $50\pi$. In another exemplary embodiment, the fiber laser system further includes a special grating pair designed to control a dispersion and a nonlinearity chirp. In another exemplary embodiment, the special stretcher further includes a dispersion managed fiber stretcher in order to compensate a TOD (dispersion slope, or a slope of dispersion versus wavelength) of a grating compressor or in a regular fiber. In another exemplary embodiment, the dispersion managed fiber stretcher includes fibers having a refractive index profile different from a conventional fiber. In another exemplary embodiment, the dispersion managed fiber stretcher includes fibers having reflection index profile different from a conventional fiber with a depressed cladding structure. In another exemplary embodiment, the dispersion managed fiber stretcher includes a fiber of a flat dispersion. In another exemplary embodiment, the dispersion managed fiber stretcher includes a fiber of a negative TOD (dispersion slope, or a slope of dispersion versus wavelength).

This invention further discloses a method for reducing a passive dispersion in a short pulse fiber laser amplification system. The method includes a step of managing a third order dispersion (TOD) to a group velocity dispersion (GVD) ratio for matching a nonlinearity chirp by implementing a special fiber stretcher, managed preamplifier, managed amplifier chain, and managed compressor in the laser fiber system to reducing the increase of a passive dispersion. In an exemplary embodiment, the step of managing the TOD to GVD ratio further includes a step of managing the TOD to GVD ratio between approximately 1.5 to 15 fs to match a nonlinearity in range between $1\pi$ to $10\pi$. In another exemplary embodiment, the step of managing the TOD to GVD ratio further includes a step of managing the TOD to GVD ratio between approximately 15 to 75 fs to match a nonlinearity in range between $10\pi$ to $50\pi$. In another exemplary embodiment, the method further includes a step of implementing a special grating pair in the special stretcher to control a dispersion and a nonlinearity chirp. In another exemplary embodiment, the step of implementing the special stretcher further includes a step of implementing a dispersion managed fiber stretcher in order to compensate a TOD (dispersion slope, or a slope of dispersion versus wavelength) of a grating compressor or in a regular fiber. In another exemplary embodiment, the step of implementing the dispersion managed fiber stretcher further includes a step of implementing fibers having a refractive index profile different from a conventional fiber. In another exemplary embodiment, the step of implementing the dispersion managed fiber stretcher further includes a step of implementing fibers having a refractive index profile different from a conventional fiber with a depressed cladding structure. In another exemplary embodiment, the step of implementing the dispersion managed fiber stretcher further includes a step of implementing the dispersion managed fiber stretcher includes a fiber of a flat dispersion. In another exemplary embodiment, the step of implementing the dispersion managed fiber stretcher further includes a step of implementing a fiber of a negative TOD (dispersion slope, or a slope of dispersion versus wavelength).

These and other objects and advantages of the present invention will no doubt become obvious to those of ordinary skill in the art after having read the following detailed description of the preferred embodiment, which is illustrated in the various drawing figures.

DETAILED DESCRIPTION OF THE INVENTION

Figure 1:
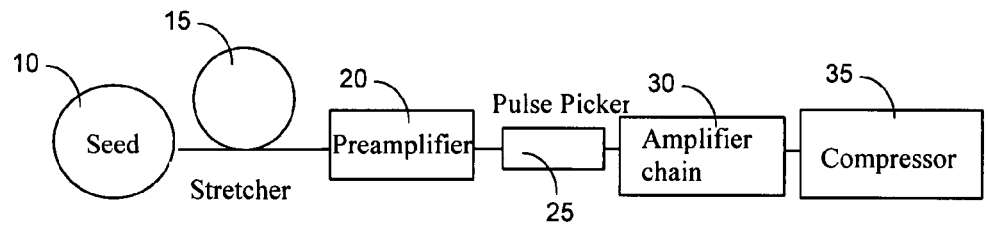
FIG. 1 is a functional block diagram for showing a conventional high-energy fiber laser system.
Figure 2A:
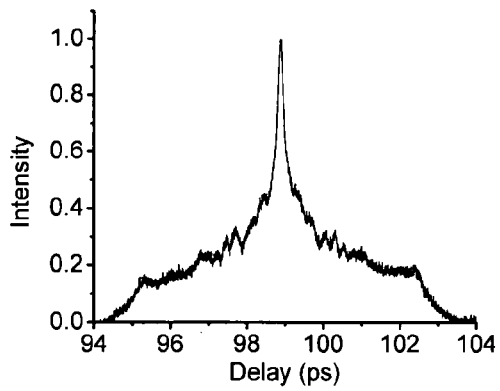
FIG. 2A are diagrams for showing the autocorrelation trace that exhibits large pedestal due to dispersion.
Figure 2B:
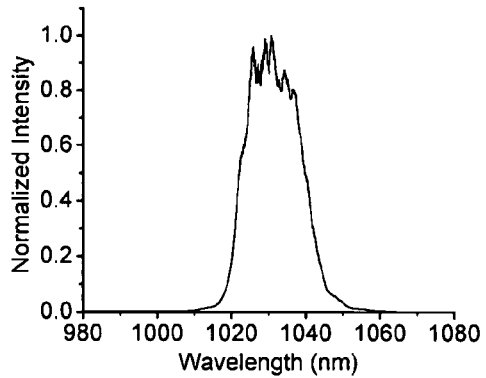
FIG. 2B is a diagram for showing the corresponding spectrum wherein the time-bandwidth product is as high as 3.7
Figure 3:
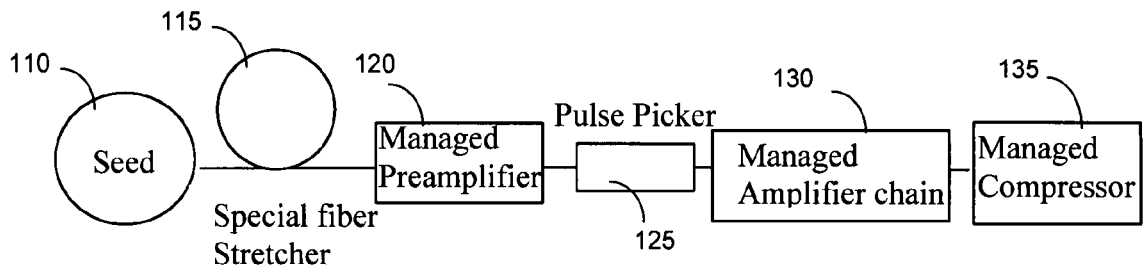
FIG. 3 is a function block diagram for showing a high-energy fiber laser system with dispersion and nonlinearity management of this invention.

FIG. 3 shows a high-energy fiber laser system of this invention for effectively managing the dispersion and the nonlinearity. Compared to the conventional system, the new fiber system comprises a special fiber stretcher 115, the managed preamplifier 120, the managed amplifier 130 after the pulse picker 125 and managed compressor 135. In each of the components including the special stretcher 115, the managed preamplifier 120, the managed amplifier chain 130 and the managed compressor 135, the nonlinearity and dispersion are managed to assure the pulse is compressible. Such configuration is necessary because the total dispersion can modify the nonlinearity. The nonlinearity can change the chirp inside the pulse. During the amplification chain, the dispersion accumulates gradually; however, the nonlinearity increases simultaneously. The interplay of these effects determines the final pulse shape of the laser system and such effects exist in every amplification stage, inside every component of the whole amplifier system. For this reason, it is extremely important to verify that despite the increase of dispersion, nonlinear phase shift and gain shaping as introduced in each stage, the pulse would always be maintained as a compressible amplification. To realize this purpose, dispersion and nonlinearity are managed in a subtle manner by implementing a fiber system as shown in FIG. 3. A laser system depicted in FIG. 3 is designed with model calculation that is necessary to ensure the precise design of every component by investigating the nonlinearity and dispersion effects of each stage of the amplification chain. Also the material and length of the fiber are chosen according to this consideration as that implemented in FIG. 3.

In the fiber CPA laser system shown in FIG. 3, modifications of every single component included in the system are carried out to assure the compressibility of the laser pulse despite the increase the nonlinearity and dispersion as the laser pulse is transmitted through these components. The design of the fiber system as shown in FIG. 3 is very different when compared with the conventional high power or high-energy fiber amplifier system to assure compressibility is maintained. The stretcher 115 is a special stretcher that is different from a conventional fiber stretcher and can be a grating-lens combination as widely implemented in the solid state CPA laser system. The special fiber stretcher is designed for optimized dispersion and nonlinearity management. Optimized dispersion and nonlinearity management is also applied to the managed preamplifier 120, the managed amplification chain 130 the managed compressor 135 and the pulse picker 125 as well.

Figure 4A:
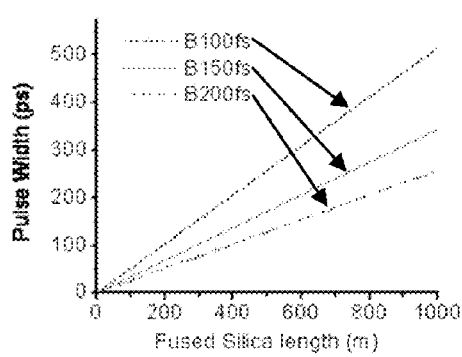
FIG. 4A is a diagram that shows the dispersion and pulse stretching in fused silica for different ML oscillator.
Figure 4B:
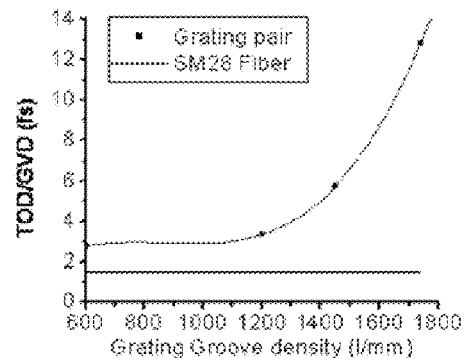
FIG. 4B shows the TOD/GVD ratio for fiber stretcher and grating pair.

In general, it is extremely important to verify that the laser transmission in the fiber laser system always has a compressible amplification in the whole process of transmission through the entire fiber CPA system. The pulse reshaping due to the nonlinear phase shift and dispersion should be controlled during the whole amplification system to help the pulse compression instead of damage the compressibility. In the fiber CPA laser system, it is necessary to modify almost every single unit to ensure the compressibility despite of the increase of nonlinearity and dispersion. To fulfill these requirements, analyses are performed to calculate the dispersion increase for some important units. FIG. 4A shows the effect of the mode-locked (ML) fiber oscillator to the dispersion increasing and pulse width broadening in fused silica for different ML oscillators. FIG. 4B shows the effect of single mode fiber and grating pair in terms of the ratio of TOD to GVD. FIG. 4A shows the pulse broadening for various original transform-limited pulses versus fiber length. FIG. 4B shows the TOD/GVD ratio for both laser transmissions in the SM 28 fiber and grating groove density with the SM 28 fiber shown just as a reference. The TOD/GVD ratio is increased with increase in the groove density in the grating pairs. Since the laser transmission in both the SM28 fiber and the gratings pairs has the same sign of TOD/GVD, therefore, the pulse will be broadened after de-chirping the pulse after amplification.

Figure 5A:
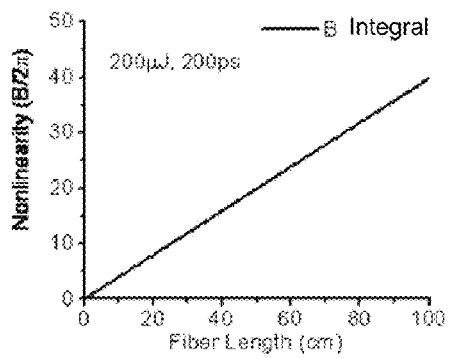
FIG. 5A is a diagram for showing the increase of the nonlinearity in a short pulse fiber amplifier.

In the modeling analyses of the fiber CPA laser amplifier, the increase of the nonlinearity, in terms of the B integral is also calculated as shown in FIG. 5A. The nonlinearity (self phase modulation SPM) induced phase change has an opposite sign with those of gratings or a SM 28 fiber. The designs of the fiber laser system include the amplifier must be able to control the dispersion to match the nonlinearity. The total TOD/GVD of the system (from gratings and SM 28) cancel the SPM induced negative phase.

Figure 5B:
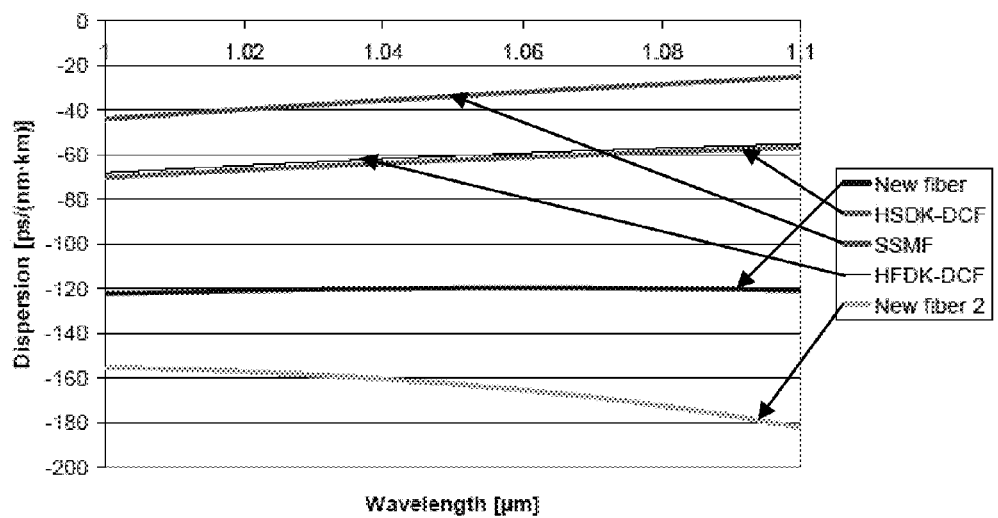
FIG. 5B shows the special designed fiber stretcher for dispersion control.

FIG. 5B is a diagram for illustrating the fiber dispersion index profile at different wavelength that may be implemented the special designed fiber stretcher for dispersion control and nonlinearity chirp compensation. In an exemplary embodiment, it is possible that a fiber with a flat dispersion may be implemented as a new fiber for the stretcher at a 1060 nm spectral band. Alternately, the stretcher may be implemented with a fiber of a negative dispersion slope over the range of 1020-1090 nm by using a depressed cladding structure. Depending on the laser design in managing/compensating TOD with the nonlinear effects through the self phase modulation (SPM), fibers with various dispersion and dispersion slope can be designed. According to FIG. 5B, a fiber as a first fiber embodiment that has a flat dispersion over the spectral range of 1060 nm or another fiber as a second embodiment that has a negative dispersion slope, about twice that of SM 28, may be implemented. Moreover, due to the negative dispersion properties, the fiber with negative dispersion slope can be used with other types of commercial fibers such as SM 28 (SSMF, corning) and dispersion compensation fiber HSDK (OFS, Denmark) to achieve various dispersions and dispersion slopes in tailoring the dispersion of the fiber laser. Also special designed grating pair to function as TOD compensator may be implemented to match the dispersion and nonlinearity, as disclosed in a prior Patent Applications 60/696,372 and 60/696,275 filed on Jul. 1, 2005 and Ser. No. 11/479,490 filed on Jun. 30, 2006 are hereby incorporated by reference in this Patent Application.

As a conclusion, the increase of passive dispersion in the short pulse high-energy amplifier is under control with the management of the ratio of high order dispersion, i.e., the TOD, to the GVD to match the nonlinearity chirp. In practice, for TOD/GVD between 1.5 fs to 15 fs, the nonlinearity should be in the range of $1\pi$ to $10\pi$. On the other hand, the nonlinearity of $10\pi$ to $50\pi$ is corresponding to TOD/GVD of 15 fs to 75 fs. Furthermore, special stretcher and special grating pair are designed to control the dispersion and to compensate the nonlinearity chirp.

Although the present invention has been described in terms of the presently preferred embodiment, it is to be understood that such disclosure is not to be interpreted as limiting. Various alternations and modifications will no doubt become apparent to those skilled in the art after reading the above disclosure. Accordingly, it is intended that the appended claims be interpreted as covering all alternations and modifications as fall within the true spirit and scope of the invention.

I claim:

1. A short pulse fiber laser amplification system comprising:
    a fiber stretcher comprising a fiber of a flat or negative third order dispersion (TOD) (a dispersion slope or a slope of dispersion versus wavelength);
    a managed preamplifier;
    a managed amplifier chain; and
    a managed compressor;
    the short pulse fiber laser amplification system being configured to:
        control an increase of a passive dispersion by managing a third order dispersion (TOD) to group velocity dispersion (GVD) ratio for matching a nonlinearity chirp; and
        maintain compressibility of a laser pulse passing through each component of the short pulse fiber laser amplification system.

2. The short pulse fiber laser amplification system of claim 1 wherein: said TOD to GVD ratio is managed between approximately 1.5 to 15 fs to match a nonlinearity in range between $1\pi$ to $10\pi$.

3. The short pulse fiber laser amplification system of claim 1 wherein: said TOD to GVD ratio is managed between approximately 15 to 75 fs to match a nonlinearity in range between $10\pi$ to $50\pi$.

4. The short pulse fiber laser amplification system of claim 1 further comprising:
    a special grating pair designed to control the dispersion and the nonlinearity chirp.

5. The short pulse fiber laser amplification system of claim 1 wherein: said fiber stretcher further comprises a dispersion managed fiber stretcher in order to compensate a TOD of a grating compressor or in a regular fiber.

6. The short pulse fiber laser amplification system of claim 5 wherein: said dispersion managed fiber stretcher comprises a depressed cladding structure with a negative dispersion.

7. The short pulse fiber laser amplification system of claim 5 wherein: said dispersion managed fiber stretcher comprises a depressed cladding structure with a flat dispersion.

8. A method for reducing a passive dispersion in a short pulse fiber laser amplification system comprising:
managing a third order dispersion (TOD) to group velocity dispersion (GVD) ratio, wherein managing the TOD to GVD ratio comprises:
matching a nonlinearity chirp by implementing a fiber stretcher comprising a fiber of a flat or negative TOD (a dispersion slope or a slope of dispersion versus wavelength), a managed preamplifier, a managed amplifier chain, and a managed compressor in said short pulse fiber laser amplification system; and
maintaining compressibility of a laser pulse passing through each component of the short pulse fiber laser amplification system.

9. The method of claim 8 wherein: said step of managing said TOD to GVD ratio further comprising a step of managing said TOD to GVD ratio between approximately 1.5 to 15 fs to match a nonlinearity in range between $1\pi$ to $10\pi$.

10. The method of claim 8 wherein: said step of managing said TOD to GVD ratio further comprising a step of managing said TOD to GVD ratio between approximately 15 to 75 fs to match a nonlinearity in range between $10\pi$ to $50\pi$.

11. The method of claim 8 further comprising:
implementing a special grating pair in said fiber stretcher to control said dispersion and said nonlinearity chirp.

12. The method of claim 8 wherein: said step of implementing said fiber stretcher further comprising a step of implementing a dispersion managed fiber stretcher in order to compensate a TOD of a grating compressor or in a regular fiber.

13. The method of claim 12 wherein: said step of implementing said dispersion managed fiber stretcher further comprises a step of implementing fibers having a depressed cladding structure with a negative dispersion.

14. The method of claim 12 wherein: said step of implementing said dispersion managed fiber stretcher further comprises a step of implementing fibers having a depressed cladding structure with a flat dispersion.

15. The short pulse fiber laser amplification system of claim 1 wherein the TOD of said fiber of said fiber stretcher ranges between 0 to $-5$ ps/nm$^2$/km.

16. The method of claim 8 wherein the TOD of said fiber of said fiber stretcher ranges between 0 to $-5$ ps/nm$^2$/km.

* * * * *